United States Patent [19]

Koizumi et al.

[11] Patent Number: 5,252,659
[45] Date of Patent: Oct. 12, 1993

[54] MOLDED POLYPROPYLENE-α-OLEFIN PRODUCT HAVING LOW COEFFICIENT OF LINEAR EXPANSION

[75] Inventors: Junji Koizumi, Nagoya; Junji Takeuchi, Inazawa, both of Japan

[73] Assignee: Toyoda Gosei Co., Ltd., Nishikasugai, Japan

[21] Appl. No.: 931,458

[22] Filed: Aug. 21, 1992

Related U.S. Application Data

[63] Continuation of Ser. No. 690,281, Apr. 24, 1991, abandoned.

[30] Foreign Application Priority Data

Apr. 26, 1990 [JP] Japan .................. 2-111316

[51] Int. Cl.$^5$ .................. C08J 5/10; C08K 3/04; C08L 23/12
[52] U.S. Cl. .................. 524/496; 524/425; 524/449; 524/451
[58] Field of Search .................. 524/425, 451, 449, 496

[56] References Cited

U.S. PATENT DOCUMENTS 4,521,487  6/1985  Mitsuno et al. .................. 428/407
4,891,399  1/1990  Ohkawa et al. .................. 524/430

*Primary Examiner*—Paul R. Michl
*Assistant Examiner*—U. K. Rajguru
*Attorney, Agent, or Firm*—Cushman, Darby & Cushman

[57] ABSTRACT

A molded product of a polypropylene composition comprising 60 to 85% by weight of a polymer mixture, 2 to 10% by weight of a fibrous filler, and 5 to 38% by weight of an extender. The polymer mixture comprises 30 to 70 parts by weight of polypropylene and 30 to 70 parts by weight of a copolymer of ethylene and an alpha-olefin having a Mooney viscosity [$ML_{1-4}$ (100° C.)] which is lower than 70 out of a total of 100 parts of polypropylene and copolymer. The copolymer forms particles dispersed in the product, and the particles have an aspect ratio of at least 5.

20 Claims, 3 Drawing Sheets (COMPARATIVE EXAMPLE 1)

(EXAMPLE 2)

MOLDED POLYPROPYLENE-α-OLEFIN PRODUCT HAVING LOW COEFFICIENT OF LINEAR EXPANSION

This is a continuation of application Ser. No. 07/690,281, filed on Apr. 24, 1991, which was abandoned.

BACKGROUND OF THE INVENTION

1. Field of the Invention

This invention relates to a molded product of polypropylene having a low coefficient of linear expansion and a good balance of mechanical properties.

2. Description of the Related Arts

Polypropylene is a thermoplastic resin which is excellent in bending strength, modulus of elasticity in bending, and other mechanical properties, and in chemical resistance, and yet is inexpensive, and is, therefore, used for making a wide range of molded products. It is used to make, for example, various molded parts forming, or attached to, the exterior of an automobile, or vessel, such as a side garnish 1, an elongated side molding 2 and bumper 3, which are shown in FIGS. 4 to 6, respectively, of the accompanying drawings.

Those parts are, however, likely to undergo a high degree of thermal expansion and contraction, as they are exposed to a widely varying outdoor temperature. For example, the variation in temperature between about 10° C. and about 40° C. produces a difference of about 3 mm per meter in the length of any such part. The expansion and contraction of such a part is likely to cause deterioration of the molding appearance, i.e. reduction of the clearance accuracy, surge, etc. The great likelihood of such a part expanding and contracting means also that the part will come to lack dimensional stability relative to its base. The lack of dimensional stability prevents increased use of polypropylene for making not only any of the parts mentioned, but also a variety of other molded products.

Attempts have, therefore, been made to add talc, calcium carbonate, mica, etc. to polypropylene in order to make a molded polypropylene product with improved dimensional stability. None of these attempts has, however, produced a satisfactory result. Japanese Patent Publication No. 15824/1981 proposes a composition which comprises polypropylene, a styrene-butadiene block copolymer, and particles of calcium carbonate treated with a fatty acid ester. This composition does not, however, have a coefficient of linear expansion which is low enough to be satisfactory. Moreover, this composition is relatively low in weatherability, because the butadiene forming the copolymer has carbon double bonds (C=C).

SUMMARY OF THE INVENTION

Under these circumstances, it is an object of this invention to provide a molded product of polypropylene with a low coefficient of linear expansion, a good balance of mechanical properties and a high level of weatherability.

Broadly, according to the invention, compositions are provided comprising a propylene polymer, an ethylene copolymer rubber, a fibrous filler, and a non-fibrous extender moldable into shaped objects exhibiting a low coefficient of linear expansion, especially in the direction in which the moldable composition flows during molding.

Further, according to the invention, molded products formed from the inventive compositions have an elongated dispersed phase of ethylene copolymer rubber particles with an aspect ratio of at least 5 in the propylene polymer matrix, thereby reducing the linear coefficient of expansion in the major axis of molded products produced therefrom.

Other features and advantages of this invention will be apparent from the following description and the accompanying drawings.

DETAILED DESCRIPTION OF THE INVENTION

Figure 1:
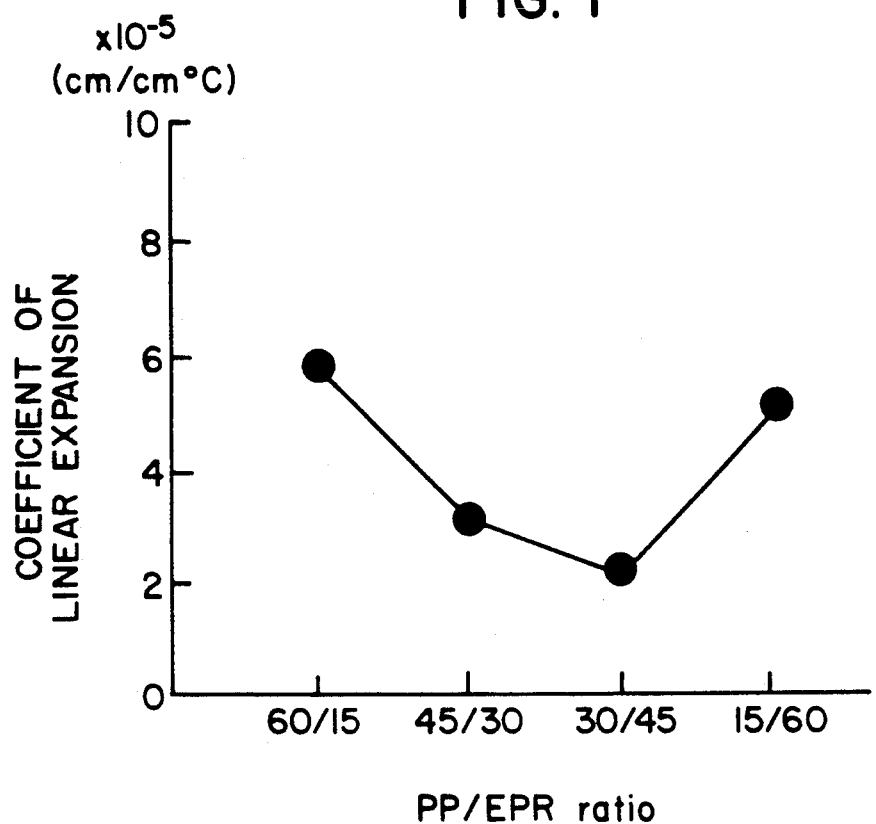
FIG. 1 is a graph showing the coefficients of linear expansion of products molded from different polypropylene compositions as will hereinafter be described in EXAMPLE 10.

According to a most salient feature of this invention, a molded product is made by, e.g., injection molding from a mixture consisting of specific proportions of a polymer which comprises polypropylene and ethylene-alpha-olefin copolymer, a fibrous filler and an extender, and the product contains particles of the copolymer having an aspect ratio of at least 5. The polymer comprises 30 to 70 parts by weight of polypropylene and 30 to 70 parts by weight of the copolymer, and consists of a total of 100 parts by weight of polypropylene and copolymer.

The polypropylene which may be used for the purpose of this invention is not only the homopolymer of propylene. A random or block copolymer of propylene and ethylene or a mixture thereof may also be used. If any such copolymer or mixture is employed, it is preferable to use one having an ethylene content of 1.0 to 15% by weight. The use of any copolymer or mixture having an ethylene content lower than 1.0% is likely to give a product having an undesirably low impact value, while the use of any copolymer having an ethylene content higher than 15% is likely to yield a product of low rigidity. Part of the polypropylene used in the copolymer may be in the form of a modified resin, i.e. polypropylene which has been modified with an unsaturated carboxylic acid or a derivative thereof and an organic peroxide.

The ethylene-alpha-olefin copolymer is made by copolymerizing ethylene and an alpha-olefin, such as propylene, butene-1, hexene-1, decene-1, 4-methylbutene-1, or 4-methylpentene-1. The copolymer therefore has substantially no crystalline region formed therein. The copolymer of ethylene and propylene, which is known as ethylene propylene rubber (EPR), enables the manufacture of a product having a particularly low coefficient of linear expansion.

The copolymer of ethylene and alpha-olefin which is used for the purpose of this invention has a Mooney viscosity [$ML_{1+4}(100°C.)$] which is lower than 70. The use of any copolymer having a Mooney viscosity of 70 or above is likely to result in a molded product having an undesirably high coefficient of linear expansion. It is preferable to use a copolymer having a Mooney viscosity which is lower than 65, and it is more preferable to use one having a Mooney viscosity which is lower than 60.

The polymer comprises, out of a total of 100 parts by weight of polypropylene and copolymer, 30 to 70 parts by weight of polypropylene and 30 to 70 parts by weight of copolymer. The use of any polymer made by employing less than 30 parts by weight of polypropylene results in a molded product having a low level of mechanical strength, and the use of any polymer made by employing more than 70 parts by weight of polypropylene results in a molded product having a high coefficient of linear expansion. The use of any polymer made by employing less than 30 parts or more than 70 parts by weight of copolymer results in a molded product having a high coefficient of linear expansion.

The mixture from which the molded product of this invention is made contains 60 to 85% by weight of polymer as hereinabove defined. The use of any mixture containing less than 60% by weight of polymer results in a molded product having a low level of impact resistance. On the other hand, the use of any mixture containing more than 85% by weight of polymer results in a product which is low in rigidity and heat resistance.

The copolymer combines with the fibrous filler to form particles having a high aspect ratio. In forming a molded product, these particles are dispersed in a matrix of polypropylene and contribute greatly to lowering the coefficient of linear expansion of the molded product, as will be described below in further detail.

Some examples of the fibrous filler which can be incorporated in the mixture are potassium titanate whiskers, zinc oxide whiskers, wollastonite, glass fibers and carbon fibers. The fibrous filler acts upon the copolymer and contributes greatly to achieving a low coefficient of linear expansion. The potassium titanate whiskers are, among other things, a good fibrous filler from the standpoint of the physical properties and dimensional stability which are required of the molded product.

The mixture contains from 2 to 10% by weight of fibrous filler. The use of any mixture containing less than 2% by weight of filler results in a failure to make a molded product having a satisfactorily low coefficient of linear expansion. The incorporation of more than 10% by weight of filler results in a mixture of low moldability producing a molded product which either curves undesirably or has a generally poor appearance, and also adds to the cost of the molded product. The filler preferably has an average fiber length of from 1 to 50 microns. The use of any filler having an average fiber length smaller than one micron results in a product which is low in physical properties and dimensional stability, while the use of any filler having an average fiber length exceeding 50 microns results in a product which has low workability.

The extender which can be used for the purpose of this invention is a non-fibrous filler, such as talc or mica which is in flaky form, or calcium carbonate which is in particulate form. A filler in flaky form is, among other things, a good extender which, when combined with the copolymer and the fibrous filler, produces a low coefficient of linear expansion. The mixture contains 5 to 38% by weight of extender. The use of any mixture containing less than 5% by weight of extender results in a molded product having low rigidity, while the use of any mixture containing more than 38% of extender results in a product having low impact resistance and a poor appearance.

The molded product of this invention contains elongated particles of the copolymer dispersed therein. These particles contribute greatly to achieving a low coefficient of linear expansion. The particles are, however, required to have an aspect ratio of at least 5. No satisfactorily low coefficient of linear expansion can be achieved if the particles have an aspect ratio which is lower than 5. The aspect ratio as herein defined is the ratio of the length of the particles to their diameter.

The mixture may further contain one or more other additives, such as an antioxidant, an ultraviolet absorber, a lubricant, an antistatic agent, a nucleator, a pigment, a flame retardant and a processing assisting agent. If any of these additives is employed, it is kneaded into the mixture when the mixture is in a molten state at a temperature which is at least equal to the melting point of polypropylene, by a single or double screw extruder, a kneader, a Brabender, a Banbury mixer, etc. The resulting molten composition is usually pelletized and the pellets are formed into a desired shape by, for example, injection, extrusion or blow molding.

Specific examples of the molded product according to this invention include a part or member attached to the exterior of an automobile or vessel, such as a side molding, garnish or bumper; a part of an electrical apparatus; and a machine part. This invention is particularly useful in a field of application in which a high degree of dimensional stability is essential.

The molded product of this invention has a very low coefficient of linear expansion, as low as about 3 to $4 \times 10^{-5}$ cm/cm °C., which therefore provides an outstanding level of dimensional stability. It is also excellent in bending strength, modulus of elasticity in bending, and impact resistance, and has, therefore, a good overall balance of mechanical properties. Moreover, it has a high level of weatherability, since the copolymer which is employed lacks a carbon double bond.

As stated above, the molded product of this invention has an outstandingly low coefficient of linear expansion. The extender, such as talc, which has been used in a conventional molded product of polypropylene, has the effect of restraining the linear expansion of the product, but only to a limited extent, since it has a flaky or particulate form, as hereinbefore mentioned.

On the other hand, the molded product of this invention contains the copolymer of ethylene and an alpha-olefin in the matrix of polypropylene with the fibrous filler and the extender. The copolymer forms, along with the filler and extender, an elongated disperse phase in the matrix of polypropylene. The presence of this elongated disperse phase reduces the linear expansion coefficient in the major axis of the molded product which thereby contributes to the overall reduction of the linear expansion coefficient in the molded product of the polypropylene composition.

The copolymer is easy to disperse, as it has a Mooney viscosity [$ML_{1+4}(100°C.)$] which is lower than 70. Moreover, the particles dispersed in the molded product have an aspect ratio of at least 5. This is another factor contributing to the achievement of a low coefficient of linear expansion.

The foregoing is an explanation of the reasons why the molded product of this invention achieves its outstandingly low coefficient of linear expansion.

Also, it is known that a molded product has a coefficient of linear expansion which is lower in the direction in which the molten material has been caused to flow during its molding process, than in any other direction. Therefore, when any molded product of this invention is made, it is advisable to use a mold which is designed to allow the molten composition to flow in the direction in which the molded product is required to exhibit a low coefficient of linear expansion (usually along its length).

This invention provides a molded product of polypropylene which has a low coefficient of linear expansion, a good balance of mechanical properties and a high level of weatherability, as is obvious from the foregoing description.

The invention will now be described more specifically with reference to several examples and comparative examples.

EXAMPLES 1 TO 9 AND COMPARATIVE EXAMPLES 1 TO 5

In each of the EXAMPLES and COMPARATIVE EXAMPLES, polypropylene (PP) and ethylene propylene rubber (EPR) as copolymer were mixed in a tumbling blender for five minutes to form a kneaded polymer mixture. The polypropylene was one of three commercially available products having different ethylene contents (% by weight) as shown in TABLE 1 below, i.e. J900 of Mitsui Petrochemical Industries, Ltd., and BC05C and BC05G of Mitsubishi Petrochemical Co., Ltd. The ethylene propylene rubber was one of three commercially available products having different values of Mooney viscosity as shown in TABLE 1, i.e. EP911P, EP941P and EP07P of Japan Synthetic Rubber Co., Ltd.

The mixture was pelletized to form polymer pellets. The pellets were fed to one end of a double-screw extruder having a length to diameter (L/D) ratio of 30 and equipped with two screws rotating in different directions. Potassium titanate whiskers as a fibrous filler and talc as an extender were fed to the screws in the midportion of the extruder and were kneaded with the polymer pellets to form pellets of a polypropylene composition. The whiskers were the product of Otsuka Chemical Co., Ltd. designated as TYSMO-D, with a length of 10 to 20 microns and an average diameter of 0.2 to 0.5 micron. The talc was the product of Fuji Talc Industries, Ltd. designated as LMR#100, and having an average particle diameter of 1.6 to 2.0 microns.

The proportion of each of polypropylene, EPR, whiskers and talc is shown in TABLE 1, and indicated as the percentage by weight of the polypropylene composition.

The extruder was set at a temperature of 220° C. and was operated at an extrusion rate of 1.2 to 3 kg per hour, while the screws were rotated at a speed of 80 rpm.

The pellets of the composition were dried with hot air for eight hours, and were injection molded to form a sample of a molded product having a predetermined shape. An 80-ton injection molding machine was used to mold the composition at a temperature of 210° C. to 220° C. by employing an injection time of 10 seconds.

Each sample was evaluated for physical properties by the methods shown below, and the results are shown in TABLE 1:

Aspect Ratio

Figure 3:
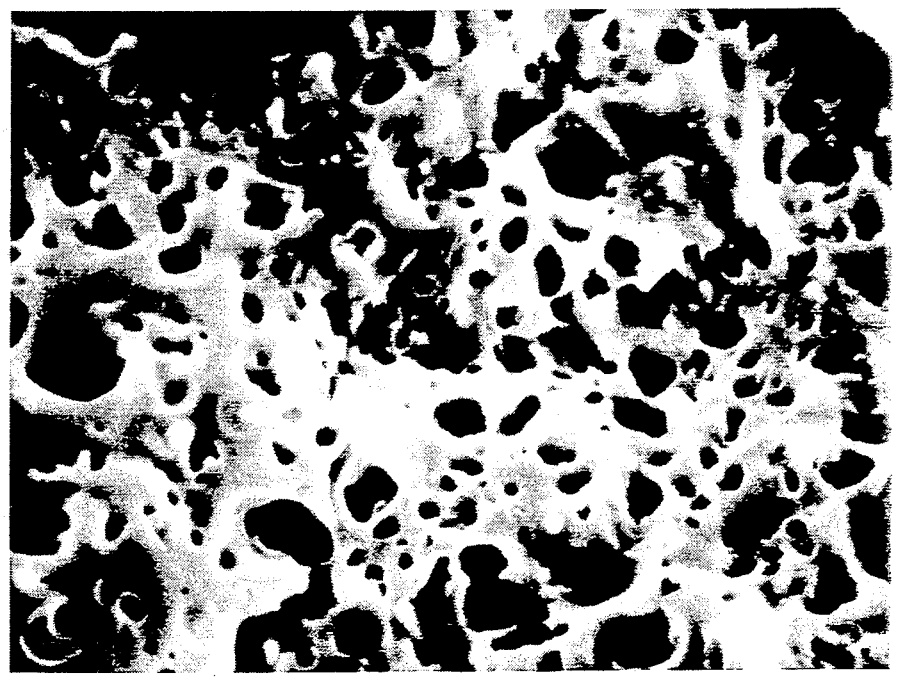
FIG. 3 is a photograph similar to FIG. 2, but showing the particles dispersed in a molded product according to COMPARATIVE EXAMPLE 1.
Figure 2:
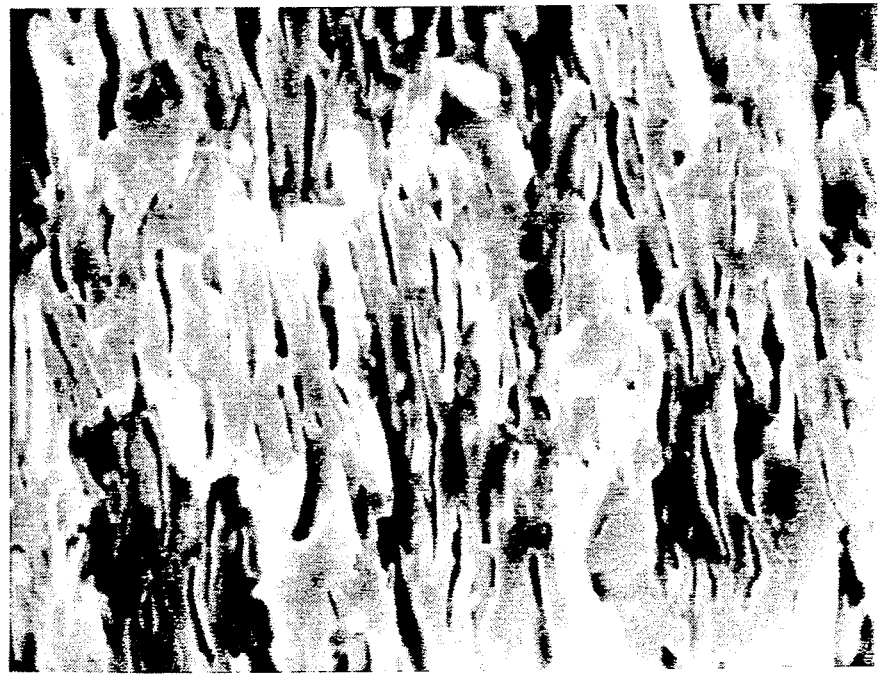
FIG. 2 is a photograph taken through a scanning electron microscope and showing, with a magnification of 5000, the structure of particles dispersed in a molded product according to EXAMPLE 2.

The length to diameter ratio of EPR particles dispersed in the molded product was measured in a photograph taken through a scanning electron microscope (see FIG. 2 or 3).

Coefficient of Linear Expansion

ASTM-D696.

Bending Strength and Modulus of Elasticity in Bending

ASTM-D790.

Izod Impact Strength

ASTM-D256 at 23° C. and −30° C.

Mooney Viscosity, $ML_{1+4}(100°\ C.)$:

ASTM-D1646.

The samples of EXAMPLES 1 to 9 of this invention were found to have a linear expansion coefficient of at most $3.9 \times 10^{-5}$ cm/cm ° C., a bending strength of at least 165 kgf/cm$^2$ (except EXAMPLE 6), an elastic modulus in bending of at least 12,700 kgf/cm$^2$ (except EXAMPLE 6), and Izod impact values of at least 6.0 kgf cm/cm at 23° C. and at least 2.3 kgf cm/cm at −30° C., as shown in TABLE 1.

On the other hand, the sample of COMPARATIVE EXAMPLE 5, which had been prepared without incorporating any EPR, showed a linear expansion coefficient of as high as $8.5 \times 10^{-5}$ cm/cm ° C. and a considerably lower Izod impact value. The sample of COMPARATIVE EXAMPLE 1, which had been made by employing EPR having a high Mooney viscosity, showed an aspect ratio lower than 5, and a high coefficient of linear expansion. The samples of COMPARATIVE EXAMPLES 2 and 3, which had both been made by employing EPR having a satisfactorily low Mooney viscosity, also showed high coefficients of linear expansion. The particles of EPR had an aspect ratio lower than 5 in the sample of COMPARATIVE EXAMPLE 2, and were nearly spherical in the sample of COMPARATIVE EXAMPLE 3. The sample of COMPARATIVE EXAMPLE 4, which had been prepared without employing any potassium titanate whiskers, had a high coefficient of linear expansion.

These results confirm that the products of this invention have a low coefficient of linear expansion, and high levels of bending strength, elastic modulus in bending and Izod impact strength, and therefore a good balance of mechanical properties, as well as a high level of weatherability.

TABLE 1

| Composition and Physical Properties | EXAMPLE | | | | | | |
|---|---|---|---|---|---|---|---|
| | 1 | 2 | 3 | 4 | 5 | 6 | 7 |
| PP | | | | | | | |
| J900 (Ethylene content = 0%) | 45 | | | | | | |
| BC05C (Ethylene content = 4.3%) | | 45 | | 45 | 50 | 25 | 45 |
| BC05G (Ethylene content = 7.1%) | | | 45 | | | | |

TABLE 1-continued

| EPR | | | | | | | |
|---|---|---|---|---|---|---|---|
| EP911P (Mooney viscosity = 15) | 30 | 30 | 30 | | 25 | 50 | 30 |
| EP941P (Mooney viscosity = 44) | | | | 30 | | | |
| EP07P (Mooney viscosity = 70) | | | | | | | |
| Potassium titanate whiskers | 5 | 5 | 5 | 5 | 5 | 5 | 2 |
| Talc | 20 | 20 | 20 | 20 | 20 | 20 | 23 |
| Aspect ratio | At least 5 | At least 5 | At least 5 | At least 5 | At least 5 | At least 5 | At least 5 |
| Coefficient of linear expansion ($\times 10^{-5}$ cm/cm °C.) | 3.2 | 3.1 | 3.3 | 3.5 | 3.9 | 3.3 | 3.9 |
| Bending strength (kgf/cm$^2$) | 321 | 176 | 165 | 170 | 320 | 101 | 170 |
| Elastic modulus in bending (kgf/cm$^2$) | 20100 | 13700 | 12700 | 13200 | 18000 | 5000 | 13000 |
| Izod impact strength at 23° C. (kgfcm/cm) | 10.1 | 53.1 | 57.1 | 55.1 | 6.0 | NB | 50.1 |
| Izod impact strength at −30° C. (kgfcm/cm) | 4.5 | 5.8 | 6.9 | 6.0 | 2.3 | 17.0 | 5.5 |

| | EXAMPLE | | COMPARATIVE EXAMPLE | | | | |
|---|---|---|---|---|---|---|---|
| Composition and Physical Properties | 8 | 9 | 1 | 2 | 3 | 4 | 5 |
| PP | | | | | | | |
| J900 (Ethylene content = 0%) | | | | | | | 75 |
| BC05C (Ethylene content = 4.3%) | 40 | 35 | 45 | 55 | 20 | 45 | |
| BC05G (Ethylene content = 7.1%) | | | | | | | |
| EPR | | | | | | | |
| EP911P (Mooney viscosity = 15) | 30 | 30 | | 20 | 55 | 30 | |
| EP941P (Mooney viscosity = 44) | | | | | | | |
| EP07P (Mooney viscosity = 70) | | | 30 | | | | |
| Potassium titanate whiskers | 10 | 5 | 5 | 5 | 5 | 0 | 5 |
| Talc | 20 | 30 | 20 | 20 | 20 | 25 | 20 |
| Aspect ratio | At least 5 | At least 5 | Below 5 | Below 5 | Unknown | At least 5 | — |
| Coefficient of linear expansion ($\times 10^{-5}$ cm/cm °C.) | 2.8 | 3.0 | 4.7 | 4.8 | 4.6 | 4.6 | 8.5 |
| Bending strength (kgf/cm$^2$) | 192 | 201 | 164 | 360 | 35 | 165 | 540 |
| Elastic modulus in bending (kgf/cm$^2$) | 14800 | 14900 | 13300 | 20000 | 1600 | 13000 | 32000 |
| Izod impact strength at 23° C. (kgfcm/cm) | 52.1 | 48.2 | 56.1 | 4.7 | NB | 40.1 | 4.1 |
| Izod impact strength at −30° C. (kgfcm/cm) | 5.7 | 5.1 | 6.2 | 1.2 | NB | 4.5 | 1.9 |

NB: not broken

EXAMPLE 10

The process of EXAMPLE 2 was followed for making four samples of molded products. Each product was molded from a composition consisting of 75% by weight of a polymer mixture composed of polypropylene (BC05C) and EPR (EP911P), 5% by weight of potassium titanate whiskers, and 20% by weight of talc. The proportions of PP and EPR in the polymer mixture, however, differed from one sample to another, so that the proportion of PP might be 60, 45, 30 or 15% by weight, while the balance of the mixture was EPR, making a total of 75% by weight. Thus, the polymer mixture used to make one of the samples was identical to what had been used in EXAMPLE 2.

Each product was examined for its coefficient of linear expansion in accordance with the method which had been employed in EXAMPLE 2. The results are shown in FIG. 1 in relation to the PP/EPR ratio of the polymer mixture employed. The products which had been made by employing the polymer mixtures having the PP/EPR ratios of 45/30 and 30/45, respectively, showed very low coefficients of linear expansion, as compared with the other samples.

A photograph was taken through a scanning electron microscope to examine the particles of EPR which had been formed in the product of EXAMPLE 2. It appears in FIG. 2 and shows the particles in a magnification of 5000. The particles were shaped like rods, as indicated by the white elongated portions of the photograph. Almost all the particles were found to have an aspect ratio of at least 5, and some particles had an aspect ratio as high as 40.

A similar photograph appears in FIG. 3, but shows the particles of EPR which had been formed in the product of COMPARATIVE EXAMPLE 1. The particles were nearly spherical and had, therefore, an undesirably low aspect ratio. Almost none of the particles had an aspect ratio greater than 4.

EXAMPLE 11

Figure 4:
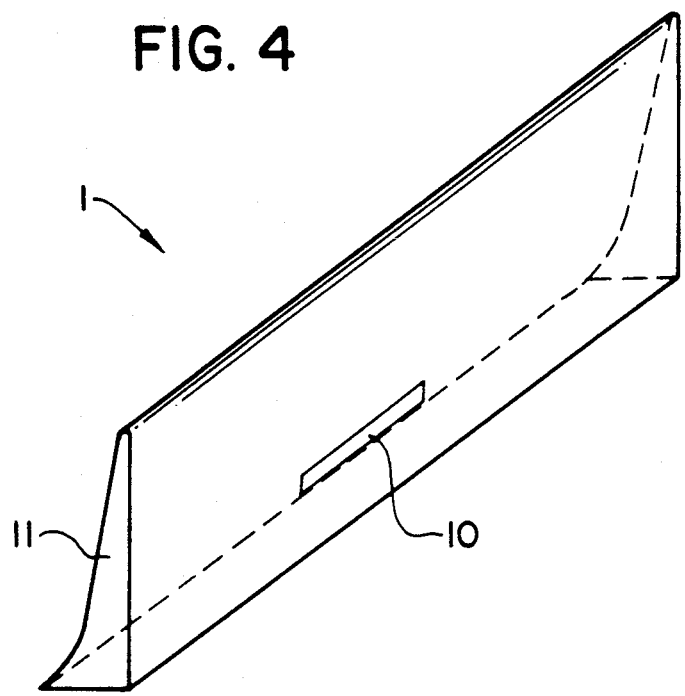
FIG. 4 is a perspective view of a molded product made in EXAMPLE 11.
Figure 5:
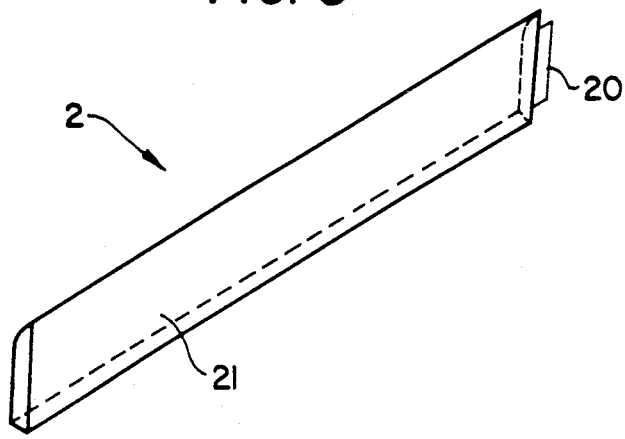
FIG. 5 is a perspective view of another molded product made in EXAMPLE 11.
Figure 6:
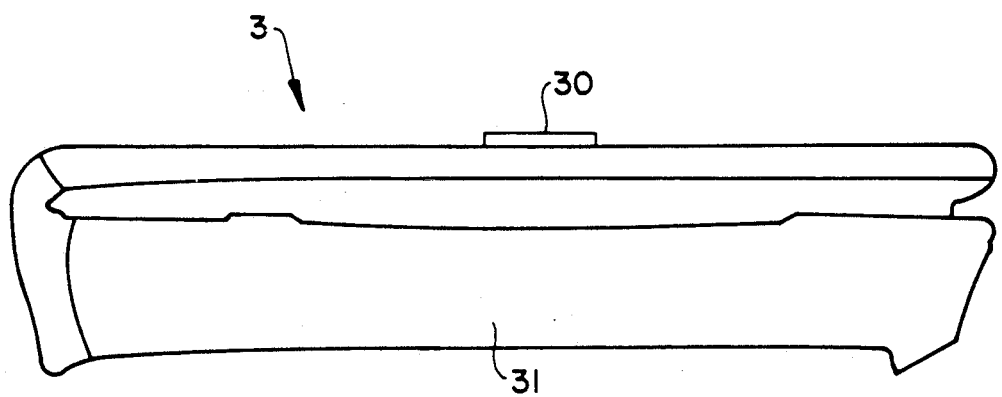
FIG. 6 is a perspective view of still another product made in EXAMPLE 11.

Attention is now directed to FIGS. 4 to 6 showing three specific examples of molded products embodying this invention. Each product was injection molded from the same molding composition used in EXAMPLE 1. Each of FIGS. 4 to 6 also shows the position of the gate through which the composition was injected into the particular mold employed.

FIG. 4 shows a side garnish 1 for an automobile. It comprises a body 11 which was molded from the polypropylene composition injected through the gate positioned at the bottom center of the body 11, as shown at 10. FIG. 5 shows an elongated side molding 2 comprising a body 21 which was molded from the polypropylene composition injected through the gate positioned at one end of the body 21, as shown at 20. FIG. 6 shows a bumper 3 for an automobile. It comprises a body 31 which was molded from the polypropylene composition injected through the gate positioned in the midportion of the body 31, as shown at 30. In any event, the position of the gate was selected so as to enable the optimum flow of the composition in the mold to ensure that the molded product had a low coefficient of linear expansion along its length. In fact, all of the products embodying this invention showed satisfactorily low coefficients of linear expansion, as compared with any molded product of polypropylene known in the art.

While the invention has been described with reference to several examples, it is to be understood that modifications or variations may be easily made by a person of ordinary skill in the art without departing from the scope of this invention which is defined by the appended claims.

What is claimed is:

1. A molded product having a low coefficient of linear expansion, comprising:
   (I) 60–85% by weight of a polymer mixture comprising, per 100 parts by weight of said mixture:
      (A) 30–70 parts by weight of a polypropylene and, correspondingly,
      (B) 70–30 parts by weight of ethylene-α-olefin copolymer particles wherein the copolymer has substantially no crystalline regions formed therein and has a Mooney viscosity lower than 70;
   (II) 2–10% by weight of a fibrous filler; and
   (III) 5–38% by weight of an extender; wherein the ethylene-α-olefin copolymer is combined with the fibrous filler to form particles having an aspect ratio of at least 5 dispersed in the molded product as an elongated disperse phase.

2. A molded product as set forth in claim 1, wherein said polypropylene is a copolymer of propylene and ethylene.

3. A molded product as set forth in claim 2, wherein said polypropylene contains 1.0 to 15% by weight of ethylene.

4. A molded product as set forth in claim 1, wherein said copolymer is ethylene propylene rubber.

5. A molded product as set forth in claim 1, wherein said copolymer comprises:
   ethylene and
   at least one alpha-olefin selected from the group consisting of propylene, butene-1, hexene-1, decene-1, 4-methylbutene-1 and 4-methylpentene-1.

6. A molded product as set forth in claim 1, wherein said filler comprises at least one material selected from the group consisting of potassium titanate whiskers, zinc oxide whiskers, wollastonite, glass fibers, and carbon fibers.

7. A molded product as set forth in claim 1, wherein said filler has an average fiber length of 1 to 50 microns.

8. A molded product as set forth in claim 1, wherein said extender comprises at least one material selected from the group consisting of talc, mica and calcium carbonate.

9. A molded product as set forth in claim 1, wherein said copolymer comprises a copolymer of ethylene and propylene, said filler comprises potassium titanate whiskers, and said extender comprises talc.

10. A moldable composition comprising:
    (I) 60–85% by weight of a polymer mixture comprising, per 100 parts by weight of said mixture:
       (A) 30–70 parts by weight of a polypropylene and, correspondingly,
       (B) 70–30 parts by weight of an ethylene-α-olefin copolymer having substantially no crystalline regions formed therein and a Mooney viscosity lower than 70;
    (II) 2–10% by weight of a fibrous filler; and
    (III) 5–38% by weight of an extender; wherein the ethylene-α-olefin copolymer combines with the fibrous filler to form particles having an aspect ratio of at least 5 dispersed in a molded product prepared therefrom as an elongated disperse phase.

11. A moldable composition according to claim 10, wherein said polypropylene is a copolymer of propylene and ethylene.

12. A moldable composition according to claim 11, wherein said polypropylene contains 1.0 to 15% by weight of ethylene.

13. A moldable composition according to claim 10, wherein said copolymer is ethylene propylene rubber.

14. A moldable composition according to claim 10, wherein said copolymer comprises:
    ethylene and
    at least one alpha-olefin selected from the group consisting of propylene, butene-1, hexene-1, decene-1, 4-methylbutene-1 and 4-methylpentene-1.

15. A moldable composition according to claim 10, wherein said filler comprises at least one kind of material selected from the group consisting of potassium titanate whiskers, zinc oxide whiskers, wollastonite, glass fibers, and carbon fibers.

16. A moldable composition according to claim 10, wherein said filler has an average fiber length of 1 to 50 microns.

17. A moldable composition according to claim 10, wherein said extender comprises at least one material selected from the group consisting of talc, mica and calcium carbonate.

18. A moldable composition according to claim 10, wherein said copolymer comprises a copolymer of ethylene and propylene, said filler comprises potassium titanate whiskers, and said extender comprises talc.

19. A moldable composition according to claim 10, wherein said composition is molded into a shaped article.

20. A method of preparing a molded polypropylene product comprising the steps of:
    a. blending a polypropylene with an ethylene-α-olefin copolymer having substantially no crystalline regions formed therein and a Mooney viscosity lower than 70 to form a blended polymer mixture;
    b. forming the blended polymer mixture into pellets;
    c. mixing the thus-formed pellets with a fibrous filler and an extender under molten conditions to form a molten mixture;
    d. forming the thus-formed molten mixture into pellets in which the ethylene-α-olefin copolymer is combined with the fibrous filler to form particles having an aspect ratio of at least 5 dispersed in the polypropylene;
    e. air-drying the thus-formed pellets;
    f. subsequently heating the air-dried pellets to form a molten polypropylene material; and
    g. molding the molten polypropylene material into a desired shape.

* * * * *